Figure 1:
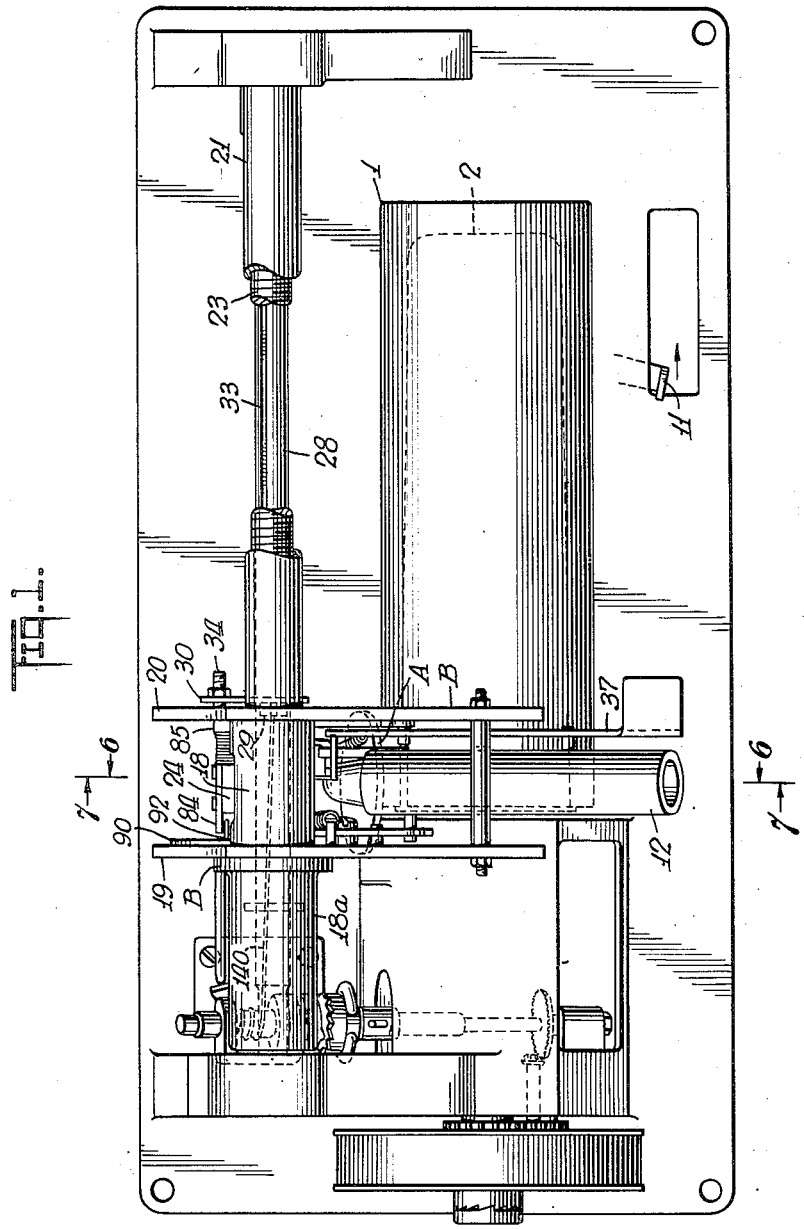

April 10, 1951     J. H. TREVITT ET AL     2,548,831
DICTATING MACHINE

Filed March 28, 1945     8 Sheets—Sheet 1

INVENTOR
John H. Trevitt
John E. Renholdt
BY
Blair Curtis & Hayward
ATTORNEYS

April 10, 1951  J. H. TREVITT ET AL  2,548,831
DICTATING MACHINE

Filed March 28, 1945  8 Sheets-Sheet 3

INVENTOR
John H. Trevitt
John E. Renholdt
BY
Blair Curtis & Hayward
ATTORNEYS

April 10, 1951  J. H. TREVITT ET AL  2,548,831
DICTATING MACHINE

Filed March 28, 1945  8 Sheets-Sheet 4

INVENTOR
John H. Trevitt
John E. Renholdt
BY
Blair Curtis & Hayward
ATTORNEYS

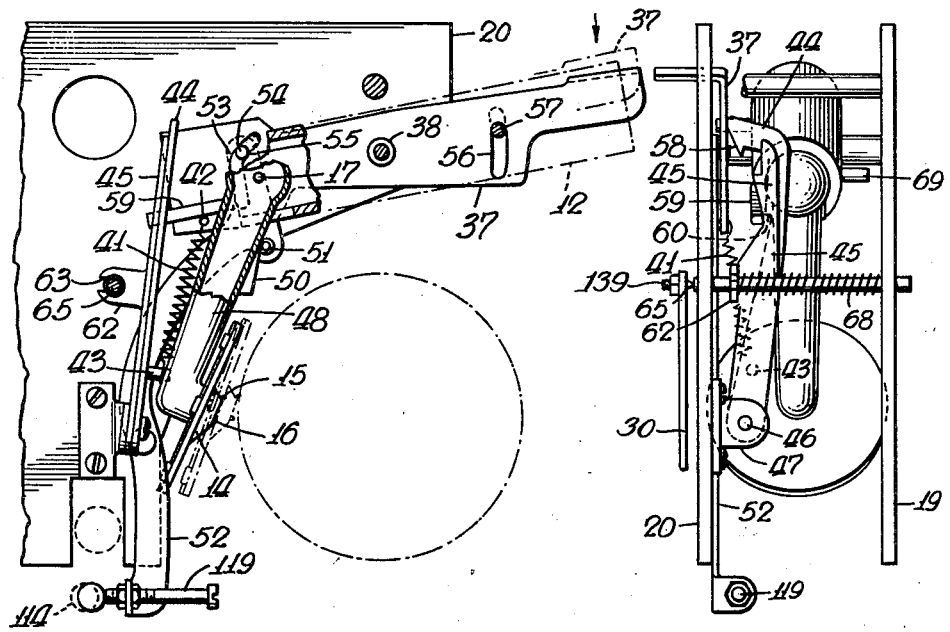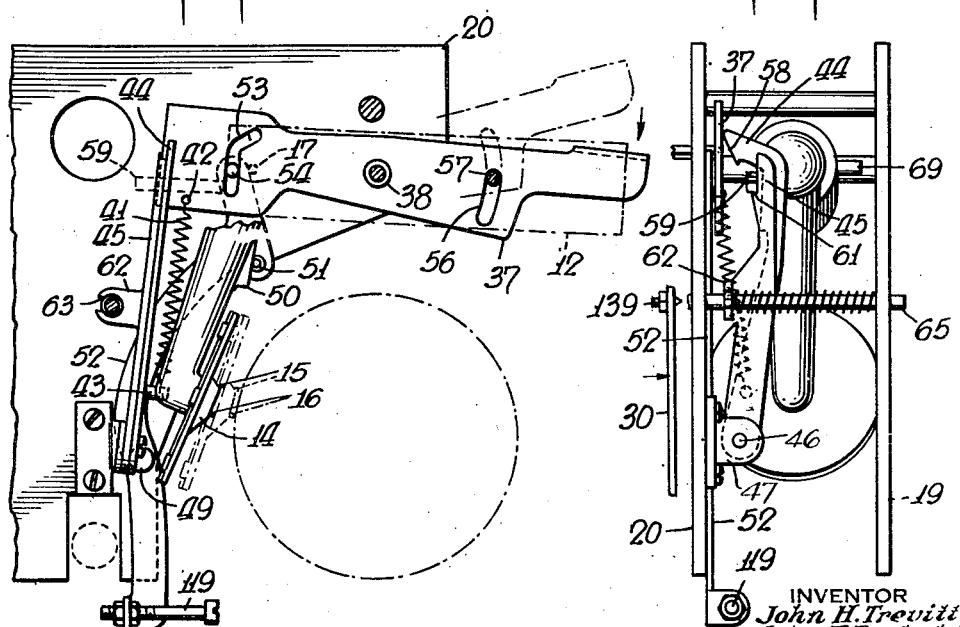

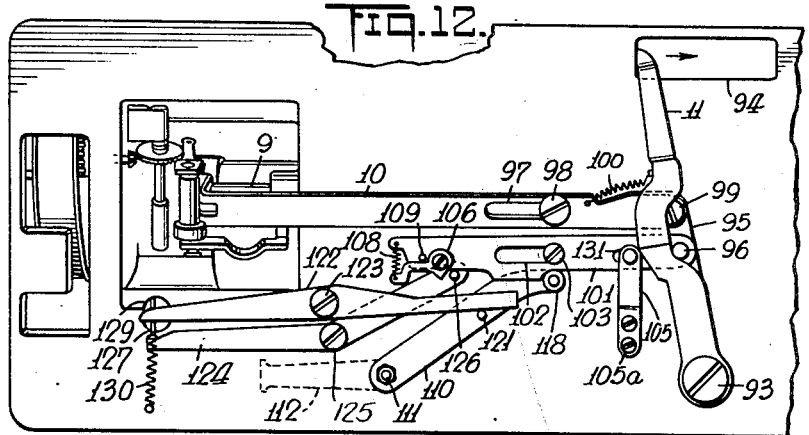
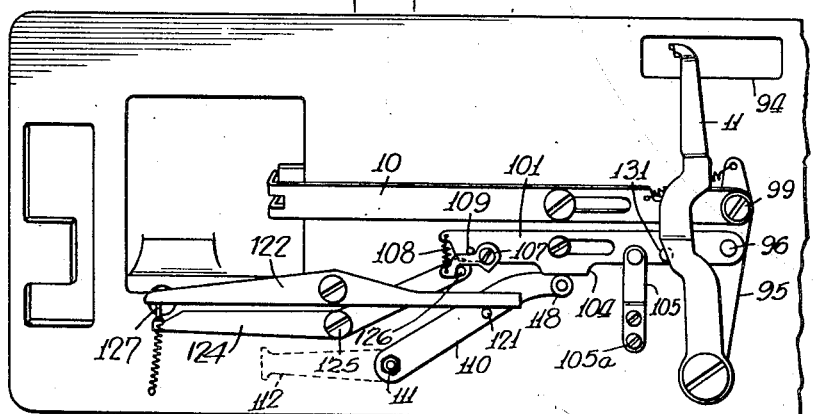
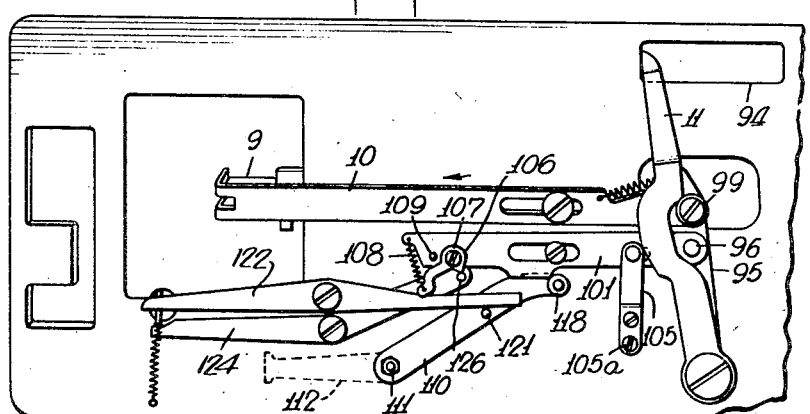

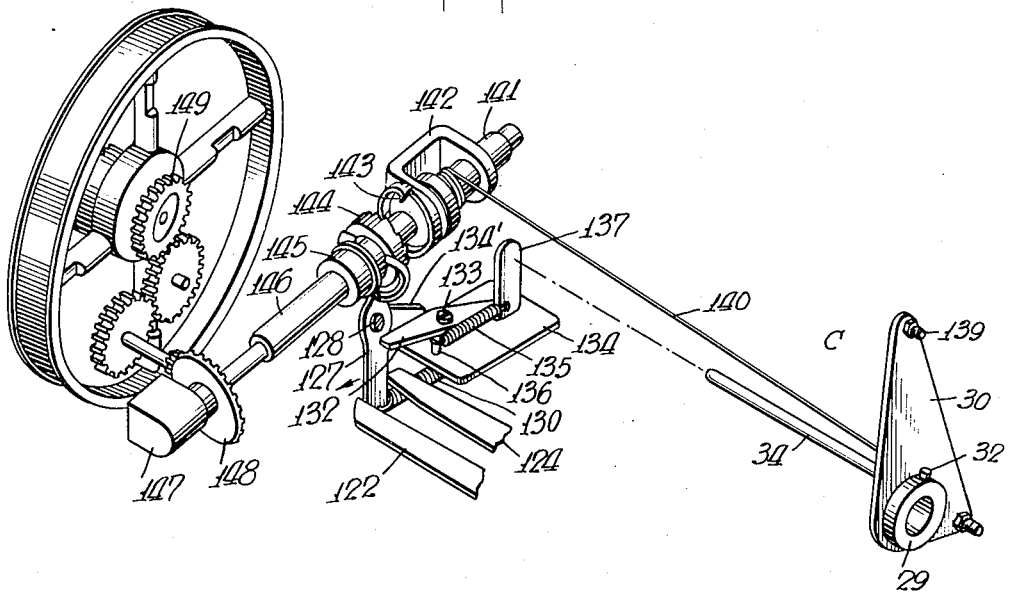
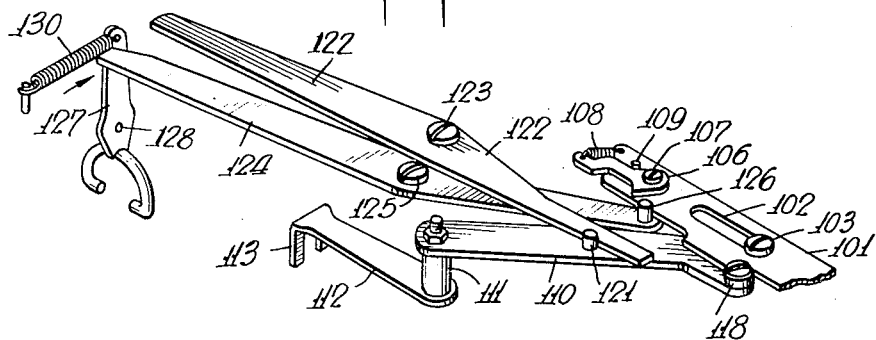

Patented Apr. 10, 1951

2,548,831

UNITED STATES PATENT OFFICE 2,548,831

DICTATING MACHINE

John H. Trevitt and John E. Renholdt, Bridgeport, Conn., assignors to Dictaphone Corporation, New York, N. Y., a corporation of New York Application March 28, 1945, Serial No. 585,222

8 Claims. (Cl. 274—17)

The present invention relates to an improvement in dictating machines.

In using some known types of such machines, operators are compelled to divide their attention between the subject matter being dictated and proper operation of the machine.

Thus, where certain phases of operation are controlled by actuating a conventional "control" or "dictate" lever, the operator either retards his dictation to some extent, or constantly risks injuring the record or relatively fragile parts of the machine, or both, by failure to have the control lever at the proper position, as when inserting or removing a record, or when repositioning the sound translation unit in relation to a record properly positioned in the machine.

Accordingly, in using a machine wherein the sound translation unit is movable to and from neutral, recording, and reproducing positions, respectively, and, with its supporting carriage, to and from operative relation to different portions of the sound track only by corresponding movement of the "dictate" lever, both the record and the styli of the translation unit are likely to be injured, if the record is carelessly inserted or removed from the machine, or if the translation unit is moved relatively to the record, unless the control lever is in neutral position.

In some cases, also, an operator, intent on his subject, may dictate long passages with the sound translation unit in neutral position and therefore making no sound track on the record.

Efforts have heretofore been made to prevent or lessen these and other injurious or wasteful effects of careless operation by providing signal devices or by locking some of the parts so that operators may be warned or compelled to make the necessary conditioning or readjustment.

So far as known, machines embodying warning or locking devices for the purposes above stated, besides being of relatively complicated construction and likely to involve excessive manufacturing cost, do not adequately solve the problems.

One object of the present invention has been to provide a dictating machine affording not only means for effective recording and reproducing, but also embodying control devices, in part automatic, whereby the operator is relieved of the need to consider the position of or to condition any control device or other part when a record is in proper operative position on the mandrel.

Thus, it is an object of the invention to provide a machine whereby, to reproduce the last dictated line, or other predetermined extent of the sound track, a simple movement of a dictate lever effects the limited backspacing of the carriage and the translation unit in relation to the sound track and the accompanying shift of said unit from recording through neutral and to a suspended reproducing condition, after which release of said lever automatically restores it to its inert or inoperative position and the translation unit rests in reproducing position against the record. To reproduce additional lines or other portions of the sound track, the same simple movement of the dictate lever control is initially involved; and the carriage is then moved manually to the desired position while the translation parts are in suspended reproducing condition. Regardless of the extent of backspacing, either predetermined or at will, the translation unit is automatically conditioned for reproducing when the lever is returned to inert position; and is automatically restored to recording condition when the carriage is again brought to the end of any previously formed sound track on the record.

A further object of the invention has been to provide a dictating machine having means whereby the simple act of removing the record from the mandrel automatically adjusts and releasably locks the translation unit to neutral condition, disengages and releasably locks said unit and its supporting carriage from operative connection with the feed screw, starts return of said carriage to its initial end position, automatically stops said return movement, and reengages the translation unit and carriage with the feed screw. With these functions effected automatically to the extent indicated, the operator is relieved of the need to consider the position of or to condition any control device or other part in preparation for removing a record.

A further object of the invention has been to provide a dictating machine having means whereby the translation unit is automatically moved to and locked in neutral condition by removal of the record from the mandrel and is released to recording condition only by completing the positioning or emplacement of another record thereon. With this arrangement, the operator is relieved of the need to consider the position of or to condition any control device in preparation for or as a part of the removal or insertion of a record; and may safely emplace a fresh record at any time after the removing devices have been actuated in a direction to remove a record.

With a record in place on the mandrel, this arrangement also insures that the translation unit will be normally in recording condition from which it may be moved only by actuating the hand control, thus preventing any inadvertently "lost" or unrecorded dictation.

In general, therefore, the invention aims to provide a dictating machine whereby, in use, each hand operation, as inserting or removing records, or backspacing, automatically sets up and releasably maintains a preconditioning of the translation unit which insures safety thereof and of the record against any inadvertent or untimely hand operation immediately following; and whereby forward feed of the carriage and the translation unit, either initially or beyond any previously formed sound track, insures positioning of said unit in recording condition.

A further object of the invention has been to provide a dictating machine embodying the structural features and the advantages in operation above set forth and which is of relatively simple construction, inexpensive to make, and easily adjustable.

Figure 2:
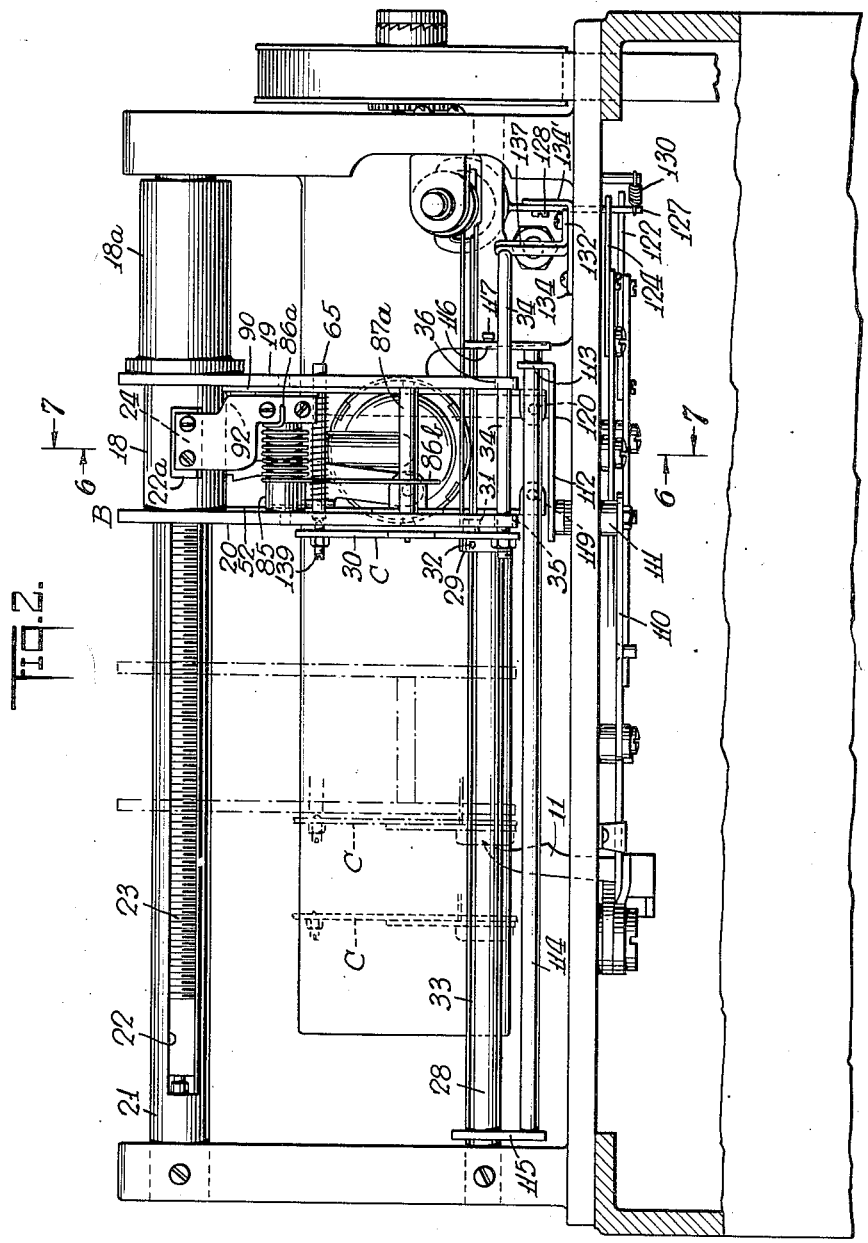
Figure 3:
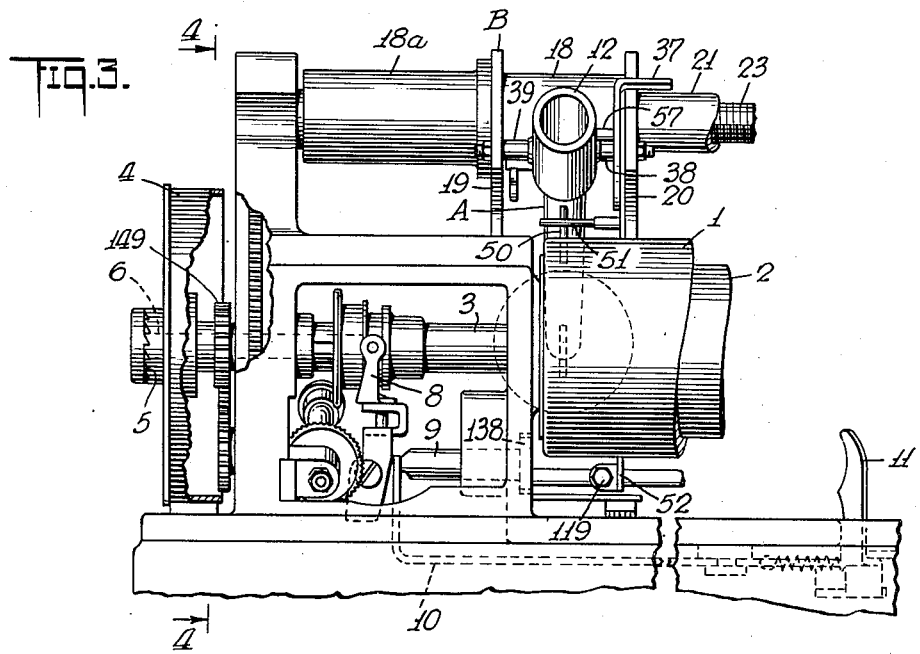
Figure 4:
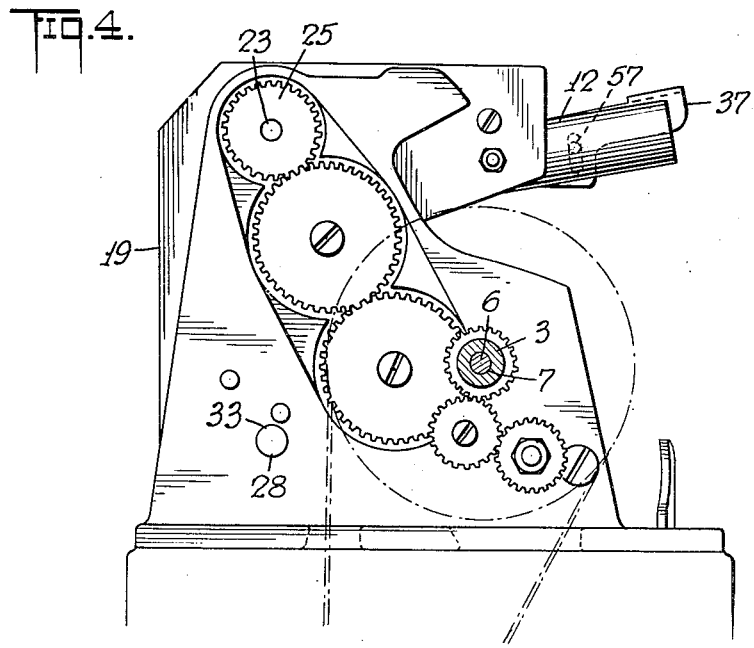
Figure 5:
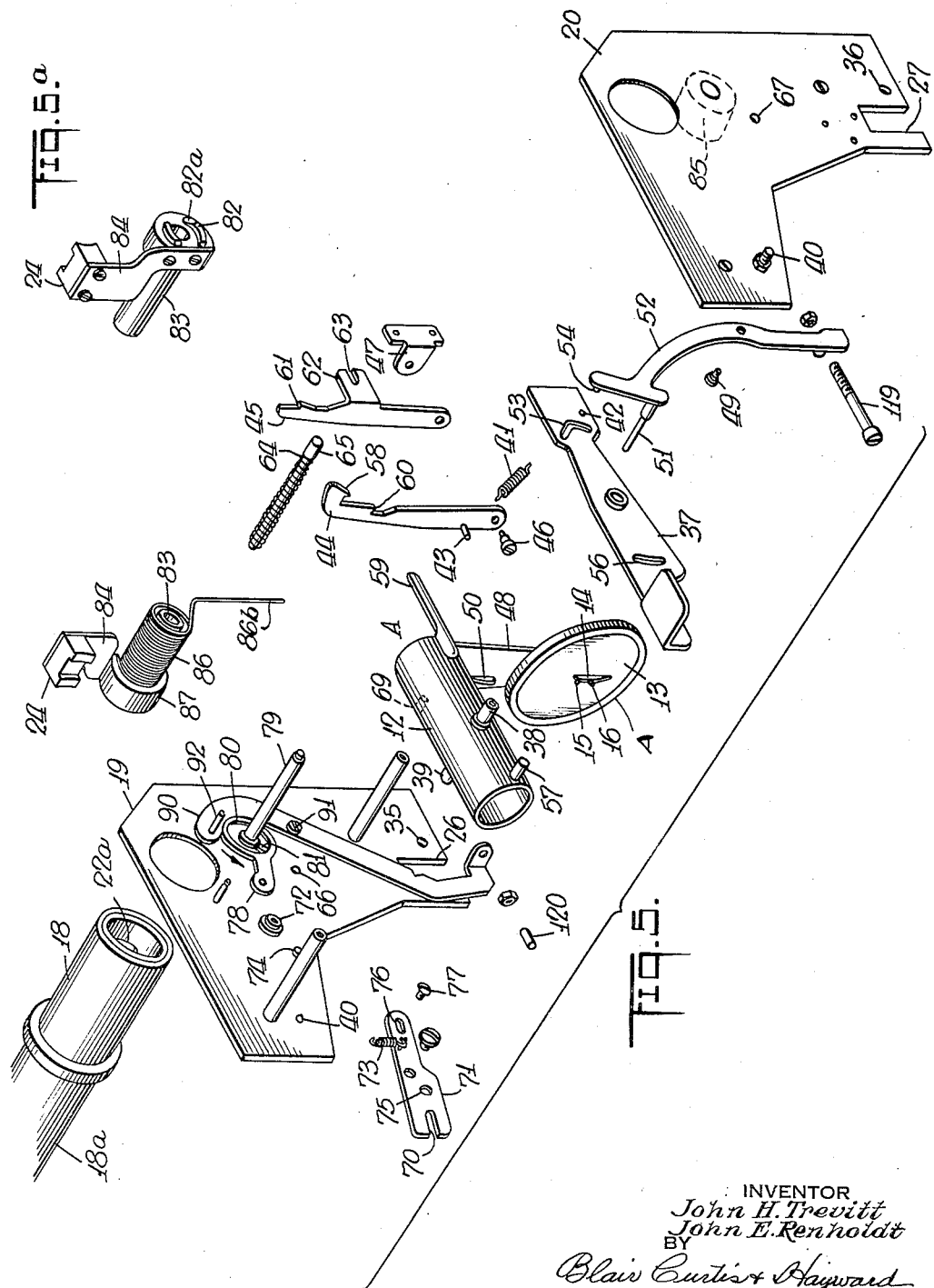
Figure 6:
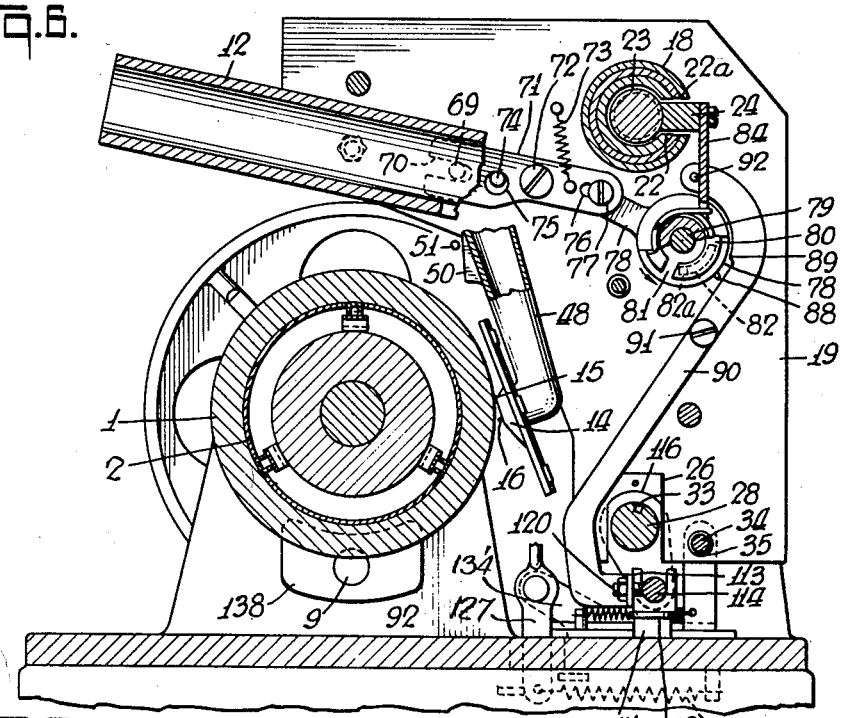
Figure 7:
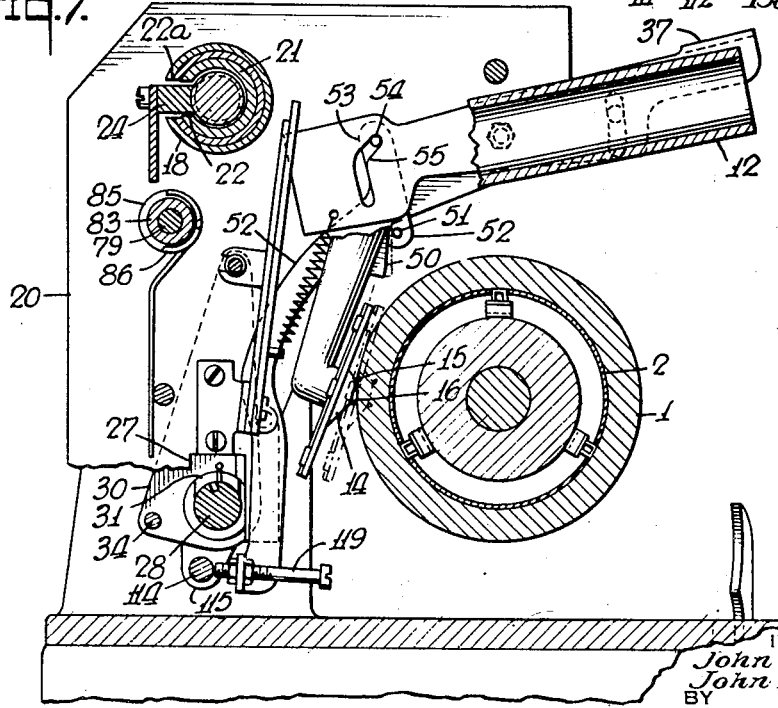

One form of dictating machine embodying our invention is described and its mode of operation set forth in the following specification and illustrated in the appended drawings wherein:

Figure 1 is a top plan view with parts broken away;

Figure 2, a rear elevation;

Figure 3, an enlarged view in front elevation of the left end portion of the machine as shown in Figure 1 and with portions broken away;

Figure 4, a vertical transverse section as viewed from line 4—4 of Figure 3;

Figure 5, an exploded view in perspective of parts of the carriage and translation unit assembly as seen from a position above and to the right of the upper right hand front corner of the carriage frame, shown in Figure 1;

Figure 5a, a view in perspective, and in reverse direction from that of Figure 5, of the feed nut and a portion of the mechanism for automatic or predetermined backspacing;

Figure 6, a vertical transverse section on the line 6—6, viewed in the direction of the arrows pointing left, Figures 1 and 2, and with portions broken away showing the parts of the sound translation unit in recording position;

Figure 7, a vertical transverse section on the line 7—7 viewed in the direction of the arrows pointing right, Figures 1 and 2, and showing parts of the sound translation unit in recording position, some being broken away to more clearly show the relative positions of other parts;

Figure 8, a fragmentary view of parts shown in Figure 7 but with the translation unit swung away from the record to neutral condition, full lines, as while removing or inserting a record, and in recording position, dotted lines, reached when the record emplacement is complete and the parts are conditioned for recording;

Figure 9, a fragmentary rear view in elevation of parts of the carriage and translation unit assembly, positioned as shown in full lines, Figure 8;

Figure 10, a fragmentary view of parts shown in Figure 7 but with the translation unit and related parts suspended as when passing through neutral during movement toward reproducing position, shown in dotted lines;

Figure 11, a fragmentary rear view in elevation of parts of the carriage and translation unit assembly as positioned in Figure 10, full lines, and a portion of the farthest advance slide;

Figure 12, a bottom plan view showing portions of the record ejecting devices and connections thereof with the automatic carriage return, feed nut control and translation unit control mechanisms, said parts being shown in relative positions occupied by them with a record operatively emplaced on the mandrel;

Figure 13, a bottom plan view of parts shown in Figure 12 but occupying the relative positions taken after a record has been removed;

Figure 14, a bottom plan view of parts shown in Figures 12 and 13 but occupying relative positions taken toward the end of the step of emplacing a record on the mandrel;

Figure 15, a fragmentary view in perspective of the farthest advance slide, devices for returning same to initial position, and control parts connected therewith; and Figure 16, an enlarged fragmentary view in perspective of parts shown in Figure 12 for connecting the ejector lever with devices for engaging and disengaging the feed nut incident to automatic advance slide return and for controlling translation unit conditioning mechanism incident to ejecting and emplacing the record on the mandrel.

In the dictating machine shown in the drawings, a sound track receiving record 1 is carried on a mandrel 2 which is mounted to rotate with a shaft 3, Figure 3. Power is controllably supplied to said shaft and to other moving parts from a pulley 4, actuated by a motor, not shown, and having a hub provided at one side with a ratchet 5. A clutch device of conventional type includes a ratchet engaging plunger 6 slidable longitudinally in a slotted end opening 7 in shaft 3, Figure 4, and means, such as yoke 8, biased to move said plunger to the left, Figure 3, to disengage ratchet 5 and movable to the right at will by the operator in a known manner to engage ratchet 5, and thus to actuate the mandrel and advance the carriage which supports the recording and reproducing devices.

A record ejecting plunger 9 is moved to the right from its position as shown in Figure 3, to eject a record in a known manner by endwise movement of sliding link 10 when the latter is actuated by manual operation of an ejector lever 11 operatively connected thereto. The connection of said lever 11 with other mechanisms for the purposes of this invention and the resulting functions will be more fully described.

Any suitable type of translation unit may be employed both to produce a sound track on the record 1 and to reproduce from such a sound track, or portion thereof, as in listening back. In the illustrated embodiment, the translation unit assembly shown is of a known acousto-mechanical type and includes a rocking tube 12 adapted to be connected at its outer end, right, Figure 4, to one end of a flexible speaking tube, not shown. A translation unit, indicated at A, Figure 5, includes a sound box having a diaphragm 13 to which is secured a stylus holder 14 carrying a recording stylus 15 and a reproducing stylus 16. Said translation unit A is pivotally mounted at 17 near the inner end of tube 12, Figures 8 and 10.

For recording or reproducing dictation, the tube 12 and translation unit A, with other devices to be described are mounted to travel longitudinally of the record 1 when the latter is positioned on mandrel 2. For this purpose, a carriage, indicated generally at B, Figure 3, for supporting and moving said unit A, comprises a sleeve 18, Figure 5, assembled rigidly with side wall plates 19 and 20. Said sleeve 18 also includes an extension 18a which serves both as a spacer or stop and to provide an effective guiding surface for the carriage as it rides on an upper hollow carriage guide rod 21 supported on the machine frame and provided with a longitudinal slot 22, Figure 2.

A threaded feed screw 23 is journaled to rotate in said hollow guide rod 21 with its threaded portion arranged opposite the slot 22 and in position to be engaged and disengaged through said slot 22 and a slot 22a in sleeve 18, Figure 2, by a feed nut 24, Figure 5, mounted and controlled in a manner to be described.

Said feed screw 23 carries at one end a gear 25, Figure 4, connected by an intermediate gear train with mandrel shaft 3 in a known manner and so that said feed screw 23 will always rotate when the feed clutch is thrown to rotate the mandrel and any record emplaced thereon.

As seen in Figures 5, 6 and 7, the side walls or plates 19 and 20 are provided with notches 26 and 27, respectively, which embrace a lower guide rod 28 extending parallel with upper guide rod 21 and thereby limit transverse rocking movement of said side wall plates.

Said lower guide rod 28, Figure 2, also carries a carriage return and latch trip carrying member or farthest advance slide indicated generally at C, Figure 15, and comprising a bushing 29 slidable on said guide rod 28 and a trip carrying plate 30. Said bushing has a rod engaging guide portion 31 extending laterally to the right of said plate 30, as shown in Figure 2. A guide pin 32 extending through said bushing at the opposite side of said plate 30 has its inner end projecting into guide slot 33 in rod 28. A trip rod 34 secured to plate 30 extends through holes 35 and 36 in said wall plates 19 and 20 respectively, Figures 2, 6 and 7, and a trip pin 139 on said plate 30 cooperates with other devices in a manner and for purposes to be described.

In general, the description thus far deals with known functions of some of the parts identified. We will now describe and explain the operation of more specific details thereof and of additional parts which embody our inventive concept either in themselves or in novel combinations.

"Dictate" control lever

A manually operated translation unit control includes a "dictate" control lever 37 pivotally mounted to rotate freely on the cross stud 38, Figure 5, of rocking tube 12 which also has an oppositely directed cross stud 39. Outer end portions of said cross studs are recessed to engage opposed pivot pins 40 mounted in the wall plates 19 and 20, thus pivotally supporting said rocking tube 12.

As indicated more clearly in Figures 8 and 9, dictate lever 37 is biased toward its normal or inert position by a spring 41 having its upper end engaging a hole 42 in said lever 37 and its lower end secured to a pin 43 extending from the exposed face of a "recording" latch lever 44 which releasably holds the translating unit in recording position as hereinafter described.

A "reproducing" latch lever 45, which, under certain conditions, releasably holds the translation unit in reproducing position and said recording latch lever 44 are pivoted at 46 on a bracket 47, Figure 9. Spring 41 serves the double purpose of always restoring "dictate" lever 37 to its normal inert position after each manual operation and of biasing recording latch lever 44 toward latching position to operate in a manner and under circumstances to be described.

Dictate lever 37 is provided primarily to enable the operator to shift the translation unit from recording condition to reproduce the last line of the sound track or other predetermined recorded portion of previously dictated subject matter. This operation necessarily involves (1) swinging the support for styli 15 and 16 away from the record to a neutral position; (2) moving said support to suspended reproducing condition, as the full line position, Figure 10; (3) back-spacing the carrier B and translation unit assembly A in relation to the feed nut to a position to reproduce the last line or other predetermined extent of the sound track, and (4) bringing the reproducing stylus 16 from neutral into contact with the sound track.

When said dictate lever 37 is employed in positioning the translation unit to reproduce more extended or various portions of the sound track, the feed nut is disengaged thereby from the feed screw. This permits the operator to move carriage B and translation unit A in either direction at will across the sound track. When lever 37 is released at the desired position of the carriage, the reproducing stylus 16 engages the corresponding portion of the sound track record.

Operating dictate lever to disengage recording stylus

Diaphragm 13 carries the styli 15 and 16 and with a hollow shank 48 forms a sound box supported on rocking tube 12 by the pivot pin 17, Figure 8. Said shank 48 has a longitudinally extending lug 50, Figure 6, presenting a cam edge disposed opposite an arm 51 which, as shown in Figures 5 and 7, extends laterally from a translation unit conditioning control or actuating lever 52 pivoted to wall 20 at 49 and operatively connected to dictate lever 37. Said arm 51 limits the extent of movement of shank 48 and hence of the styli toward mandrel 2, as indicated in dotted lines in Figure 7, and also cooperates with dictate lever 37 to move said styli in the opposite direction or to neutral.

For this purpose, dictate lever 37 has a cam slot 53 which receives a pin 54 extending laterally from lever 52 and which normally, i. e., with the lever 37 inert, as seen in Figure 7, and the translation unit in condition either for recording or reproducing, occupies the topmost position at the upper end of slot 53. Said slot defines a cam shoulder 55, so that, when the outer end of dictate lever 37 is pressed down for back spacing or reproducing, the first increment of said downward movement, as from the dotted line position to the full line position, Figure 8, causes said shoulder 55 to lift and bear against pin 54 and imparts a short counter-clockwise rocking movement to lever 52. Arm 51, moving with lever 52, bears against an upper end portion of lug 50 and swings the shank 48 sufficiently to carry the sound box and styli away from the mandrel or record and to neutral or disengaged position.

Continued downward movement of the outer end of dictate lever 37 to the full line position, Figure 10, carries shoulder 55 upwardly past pin 54 and brings lower end portions of slot 53 into guiding engagement with said pin 54 to hold the sound box and styli in said neutral position, as seen in full line, Figure 10, while permitting movement thereof transversely of the mandrel, in this instance in a vertical direction, to a suspended reproducing condition. Thus, when the carriage B and the translation unit A are moved as hereinafter described in relation to a record on mandrel 2 with or after the pressing of lever 37 to the end position shown in full lines in Figure 10, the sound box or translation unit will always be in neutral or disengaged position.

Lever 52 is also actuated by means hereinafter described and connected with ejecting and emplacing the record to control the movement of the sound box to and from the full line or neutral position, Figure 8, independently of operation of said dictate lever 37. This movement to neutral is made as an incident of operating ejector lever 11 to eject the record from mandrel 2.

Said neutral position is maintained during removal of the record and continues until emplacement of the next record is completed and the carriage B and advance slide C are returned to initial or starting position. These mechanisms will be more fully described in connection with a later detailed description of the ejector lever 11 and the farthest advance slide C and an explanation of their mode of operation and of their relation to other parts.

*Rocking tube 12 to condition translation unit*

Returning to dictate lever 37 and connected parts, said lever 37 has a curved slot 56 which is engaged by a pin 57 extending laterally from tube 12. The recording position of said tube 12 and pin 57 in relation to dictate lever 37 is shown in Figure 7 and dotted line portion of Figure 8.

As previously explained, operation or tilting of lever 37 moves the styli and connected parts to neutral. The same movement of said lever 37 causes an upper edge portion thereof to ride upwardly along an inclined face 58 of the top end portion of recording latch lever 44, Figure 9. This displaces said latch lever to the right against tension of spring 41. Tube 12 has a latch bar 59 projecting longitudinally from its inner end in position to be releasably engaged by a downwardly facing latch shoulder 60 on said recording latch lever 44 which retains said tube 12 in the angular position shown in Figure 8 (recording) until released by said displacement of latch lever 44 to the right.

Said initial movement also brings the top end of slot 56 against pin 57, as shown in full lines in Figure 8. Continued pressing down of the free end of dictate lever 37 rocks tube 12, now freed from latch 44, to the end position shown in Figure 10, dotted line, whereupon latch bar 59 engages the upwardly facing shoulder 61 of reproducing latch lever 45, Figure 11, to releasably hold the sound box in reproducing position, until said lever 45 is displaced to the right.

For this purpose, latch lever 45 which is pivoted at 46 on bracket 47, as previously described, has a lug 62 provided with an open end slot 63 which engages an annular groove 64 in a slide pin 65. Said pin 65 is mounted for limited endwise sliding movement in the holes 66 and 67 in the side wall plates 19 and 20, respectively. A compression spring 68 has one end bearing against wall plate 19, Figure 9, and its opposite end bearing against the lug 62, thereby biasing latch lever 45 and the pin 65 toward the left, as viewed in Figure 9. The left hand end of pin 65 projects beyond the outer face of wall 20 a predetermined extent during reproducing and in position to engage the trip member 139 carried by plate 30 of the farthest advance slide C which releases bar 59 from shoulder 61 under circumstances to be described, thus restoring the sound box to recording condition.

When the outer end of dictate lever 37 is freed after being pressed down, said lever by tension of spring 41, resumes its normal inert position until again actuated by the operator. This result follows whether the preceding operation of lever 37 was to effect a simple automatic or limited back space, or part of a manual back space for reproducing more extended or different portions of the sound track.

*Automatic back-spacing*

Operation of the dictate lever 37 toward the position shown in full lines, Figure 10, and the resulting rocking movement of tube 12 also produce a limited or predetermined automatic back-spacing movement of carriage B and translation unit A in relation to nut 24 which, for that purpose, remains in feeding engagement with feed screw 23, although it is disengaged therefrom for the more extended or varied back spacing to be described.

Said automatic limited back spacing is effected through the tilting or rocking movement of tube 12 which is provided with a laterally extending lug 69. Said lug engages an open end slot 70 in a lever 71 pivoted on wall plate 19 at 72 and biased counterclockwise, Figure 6, by a spring 73. The extent of rocking movement of lever 71 is limited by a stud 74 mounted on wall plate 19 and with an end portion extending through a hole 75 in lever 71 of greater diameter than said stud. Lever 71 also has a closed slot 76 which engages a stud 77 on a cam lever 78. Said lever 78 is mounted to rotate freely on an end portion of a stud 79 supported at its ends between walls 19 and 20. An annular recess or groove 80 is formed in the exposed face of the enlarged end portion of lever 78, Figure 5, and is interrupted by a cam lug 81. Thus, when said lever 78 is rocked in the direction of the arrow, Figures 5 and 6, by lever 37 through tube 12 and lever 71, cam lug 81 rotates counterclockwise therewith, and, in so doing, rides up on a cam 82 extending from an end face of an enlarged portion of sleeve 83, Figure 5a. The carriage B is thereby shifted to the left, Figure 5, a corresponding distance which constitutes the extent of the automatic back spacing of the translation unit A in relation to feed nut 24.

Said cam 82 is provided with a tapered end portion 82a and projects into the annular recess 80 from said end portion of a sleeve 83 to which is secured a bracket 84 carrying the feed nut 24. Said sleeve 83 is mounted between walls 19 and 20 in sliding relation to and for limited rotation on stud 79 and has its smaller end loosely engaged in a hollow hub-like projection 85 concentric with stud 79 and extending inwardly from the inner face of wall 20.

The inner end of projection 85 acts as an abutment for one end portion of a combined expansion and torsion spring 86, the other end portion of which bears against the shoulder 87 of sleeve 83. Accordingly spring 86 acting as an expansion spring, biases the carriage in a direction to bring the recess 80 of lever 78 thereon into meshing relation with cam 82, thus presenting cam lug 81 in position to ride up on said tapered end portion 82a of said cam 82 when lever 78 is actuated as above described.

It will be apparent that, during said automatic back spacing, feed nut 24 remains in engagement with the feed screw 23 toward which it is biased by said spring 86 acting as a torsion spring, one end of which, as 86a, for this purpose bears against an outer portion of bracket 84 and the other end 86b against a cross rod 87a.

*Manual back spacing with feed nut disengaged*

Sleeve 83 to which bracket 84 is secured is free to rotate on stud 79 to a limited extend against pressure of spring 86, or so that feed nut 24 may be disengaged at will from said feed screw 23 and returned thereto by said spring 86. This action is required where the operator desires to position the carriage and the translation unit for reproducing at parts of the sound track other than that reached by the above-described automatic back spacing. With the feed nut disengaged, as by holding the dictate lever pressed down to its extreme down position, it will be clear that the carriage may be moved through said lever by hand to and from any position between its initial recording position and that defined by the position of the farthest advance slide which also marks the end of the sound track.

As seen in Figure 6, to disengage the feed nut 24 from screw 23, for sliding the carriage by hand, bracket 84 is rocked clockwise. For this purpose, a cam pin 88 extending from the periphery of the enlarged end portion of lever 78 is moved into contact with a cam surface 89 on the edge of a feed nut control lever 90 pivoted at 91 on wall 19. An arm 92 extends laterally from lever 90 and in position to engage bracket 84. The movements of the parts are so timed that, when lever 78 is actuated, cam pin 88 will not reach and act upon lever 90 until after the previously described automatic back spacing of carriage B and the shift of translation unit A to reproducing condition have occurred. After each automatic back spacing, dictate lever 37 returns automatically to inert position. If the operator wants to read back from a more remote portion of the sound track than that presented by automatic back spacing, lever 37 is depressed to full extent and held there while the carriage is slid back to the desired position. If that position is too far, an intermediate position is reached by again depressing lever 37 to its full extent and sliding the carriage forward to the desired position.

*Farthest advance slide*

In reproducing, whether a predetermined portion of the sound track near its end or any portion thereof selected at will, the carriage feeds forward toward the point from which it was back-spaced for reproducing. It is one function of the farthest advance slide in cooperation with other parts to effect automatic reconditioning of the translation unit from reproducing to recording when the reproducing stylus reaches the end of the sound track. This avoids any need for special care by the operator in regard to the position of the carriage or the translation unit and requires no hand operation at that point to restore the parts to recording condition.

The farthest advance slide C, is moved toward the left, Figure 2, along with carriage B as the latter is advanced by feed screw 23 in recording. During this movement, an adjustable trip pin 139 extending through plate 30 of the farthest advance slide C engages the left end of slide pin 65 and presses said slide pin endwise toward the right against compression spring 68. This holds reproducing latch lever 45 in inoperative position during recording.

When the carriage is back-spaced as previously described, it moves away from slide C and thus disengages the end of slide pin 65 from trip pin 139. Latch lever 45 is thereby released to normal latching position and immediately engages the latch bar 59 to hold rocking tube 12 and connected parts in reproducing condition. When the carriage again reaches the advance slide at the end of the reproducing run, the leading end of slide pin 65 reengages trip pin 139 on plate 30 and slide pin 65 is again pressed back to disengage latch lever 45 from latch bar 59 so that tube 12 and connected parts automatically resume recording status which is maintained at all times while carriage B is moving against farthest advance slide C.

In this connection, the reengagement of carriage B with slide C through the trip pin 139 tends to tilt said slid C enough to cause frictional engagement with guide rod 28 long enough to produce the endwise latch releasing thrust of slide pin 65. Thereafter, and as soon as the plate 20 comes against bushing 29, said bushing and the slide C are free to advance with further feeding movement of carriage B.

*Record ejector lever*

Lever 90 is also actuated by other devices operating independently of lever 78 to disengage nut 24 from screw 23 as an incident of actuating the ejector lever 11 to remove a record from the mandrel 2 and of preparing for automatic feed back to initial position of the farthest advance slide and the carriage in a manner to be described.

As previously indicated, when the free end of ejector lever 11 is moved by the operator in the direction of the arrow, Figure 12, to eject a record from mandrel 2 by actuating plunger 9, (a) the translation unit A is releasably locked in neutral condition; (b) feed nut 24 is disengaged from the feed screw; and (c) devices operate to feed the farthest advance slide C and the carriage B back to initial or starting position.

Ejector lever 11 is pivoted at 93, Figures 12 to 14, inclusive, with its free end extending upwardly, Figure 2, through a slot 94 in the base plate of the machine frame. A lever 95, also pivoted at 93 and arranged between lever 11 and the bottom surface of said base plate, has a stud 96 extending across and in the path of movement of an edge portion of lever 11 when the latter is moved to the right from the normal position shown in Figure 12. After the resulting swing of lever 95 to the extreme position shown in Figure 13, lever 11 is free to swing in either direction within the limits of slot 94 and is returned to its original or initial position by stud 96 moving toward the left, Figure 12, only when another record is emplaced on mandrel 2.

*Ejector devices*

Slide 10, which actuates ejector plunger 9, has a slot 97 engaging a pin 98 secured in the base plate to guide and limit the endwise movement of said slide which is pivoted to lever 95 at 99. A tension spring 100 connects a portion of slide 10 with a free end portion of lever 95 in a manner which tends to dispose them in a straight line.

Ejector lever operated controls

Lever 95 also imparts endwise sliding movement to a cam slide 101 having one end pivoted on stud 96. A slot 102 in slide 101 engages a pin 103 fixed in the frame and adapted to guide and limit endwise movement of said cam slide, one edge portion of which has a cam shoulder 104. A leaf spring 105 is secured to the frame at 105a and is arranged with a free end portion provided with a conical detent bearing frictionally against cam slide 101 and yieldingly pressing said slide against an adjacent surface of the frame during the greater part of its endwise movement. Slide 101 also has a hole 131, Figure 13, positioned to be engaged by said detent on spring 105 just before the record being emplaced reaches its operative position on mandrel 2. This releases slide 101 from frictional contact with said spring 105 whereupon spring 100 acts to complete the return movement of slides 10 and 101 and levers 95 and 11.

Cam slide 101 also carries a cam pawl 106 pivoted thereon at 107. A spring 108 biases one end of pawl 106 toward a stop pin 109 arranged to limit the extent of swinging movement of said pawl in a clockwise direction, Figures 12 to 14.

When ejector lever 11 is actuated in the direction of the arrow, Figure 12, to eject a record, cam slide 101 is moved endwise to extended position, as seen in Figure 13. This movement of said slide simultaneously produces the previously described conditioning of the translation unit to neutral, the disengagement of feed nut 24 from the feed screw, and starts back feeding of the farthest advance slide C and carriage B to initial starting position. With said cam slide 101 in extended position, lever 11 is free to rock within the limits of slot 94 as above noted.

When slide 10 is actuated in the direction of the arrow, Figure 14, as when a fresh record is emplaced on mandrel 2, lever 95 is rocked counterclockwise to return ejector lever to its original left hand position and to restore cam slide 101 and connected parts to their several initial positions, as above described.

Devices for conditioning the translation unit to neutral and disengaging the feed nut 24, incident to operation of the ejector lever 11, include a lever arm 110 secured at one end of a shaft 111 which extends through and is journaled in the bottom plate of the machine frame. A lever 112 having a bifurcated end 113 is secured to the opposite end of said shaft 111, Figure 16. As seen in Figure 2, said bifurcated end 113 embraces a bail or rod 114 mounted between plates 115 and 116 and forming therewith a swinging frame. Each of said plates has a hole by which it is engaged with rod 28 and is free to rock thereon. A pin 117 fixed in rod 28 holds plate 116 and said frame against endwise movement to the right, Figure 2, on said rod 28. Thus, it will be clear that when lever arm 112 is rocked from inoperative to operative position, it will transmit limited rocking movement to bail 114 and thence to the translation and feed devices in a manner to be described.

Such movement occurs when, in moving from the position shown in Figure 12, to that shown in Figure 13, cam slide 101 brings shoulder 104 against cam roller 118 on lever arm 110, and thereby displaces said arm to the position shown in Figure 13 and causes a like angular displacement of arm 112.

The direction and approximate extent of swinging movement of bail 114 to swing the translation unit to neutral is indicated in Figure 8, although the relationship of certain of the parts as therein shown has previously been described as incident to the first increment of downward movement of dictate lever 37, i. e. from dotted to full line position. The effect, however, on said translation unit is the same and is produced by causing lever 52 to rock in a counterclockwise direction, Figure 8, but by different means from those first considered.

Said lever 52 has at its lower portions an adjustable pin 119 arranged with an end bearing against a portion of bail 114, so that when the latter is displaced by the swinging of lever arm 112 from the dotted to the full line positions, Figure 8, lever 52 rocks a corresponding amount; and pin 51 thereon moves shank 48 and the styli thereon to the full line or neutral position shown. This result is produced independently of any hand operation of dictate lever 37 and without causing any substantial shift thereof from its normal inert position.

Feed nut disengagement

The same displacement movement of bail 114 also causes feed nut control lever 90 to rock clockwise, as viewed in Figure 6, and independently of any hand operation of dictate lever 37. For this purpose lever 90 carries at a lower portion, an adjustable pin 120 arranged with an end normally bearing against bail 114.

After said bail 114 has been displaced coincident with ejection of a record as and for the purposes above described, the parts actuated thereby are releasably locked in their respective safety positions. Thus, the feed nut 24 cannot reengage the feed screw until the farthest advance slide C has been returned to its initial or starting position; and the translation unit cannot move from neutral until a record is emplaced on the mandrel 2 and said advance slide C has been returned to its initial position. This, in effect, double locking of the translation unit in neutral condition insures safety of the unit and of a record whether the latter is emplaced before or after the farthest advance slide C reaches its initial or starting position by operation of the devices for that purpose to be described.

That locking feature associated more particularly with actuation of the parts induced by emplacement of a record becomes effective when endwise movement of slide 101 causes the rocking of lever arm 110 to the position shown in Figure 13. If no other lock were present, lever arm 110 would swing back to its original position, Figure 12, as soon as a record is emplaced on mandrel 2.

However, said lever arm 110 has a stop pin 121 which is engaged by an end portion of a lever 122 pivoted to the frame at 123 and actuated in a manner to bear against said pin 121 when a record is ejected. Thus, even if slide 101 is returned to normal position and so that roller 118 could resume its first position, Figure 12, said lever 122 blocks return of lever arm 110 until released by the return of the farthest advance slide to its initial position.

Devices operative on return of farthest advance slide

Record ejecting movement of lever 11, operating through slide 101 also actuates a lever 124 pivoted to the machine frame at 125. A pin 126 at one end of lever 124 is in the path of movement of cam pawl 106 on slide 101. Movement of said slide 101 from the position shown in Figure 12 to that shown in Figure 13 carries said pawl 106 across pin 126 to tilt lever 124 around pivot 125. This rocks in one direction, clockwise, Figure 15, a clutch operating lever 127 pivoted at 128, Figure 15, and extending through an opening 129 in the bottom plate of the machine frame. A spring 130 biases said lever 127 in the opposite direction. When lever 124 is tilted and thereby rocks clutch operating lever 127, as aforesaid, the latter engages and displaces an adjacent end portion of locking lever 122 which now swings to engage pin 121 on lever arm 110 for the purposes above explained.

Clutch operating lever 127 cooperates with a latch or detent lever 132, Figure 15, to hold locking lever 122 in locking position and to release the same when the advance slide reaches its initial end position.

For this purpose, latch lever 132 is pivoted upon a plate 134 secured to the base plate of the machine and providing an upstanding latch stop 134', one edge of said latch 132 being disposed in substantially parallel relation to and slightly spaced from a side of stop 134', Figure 15. A spring 135 having one end secured to the latch lever 132 and the other to a pin 136 biases the free end of said latch lever toward said lever 127 and said stop plate 134'. Thus, when lever 127 is rocked in the direction indicated by the arrows in Figures 15 and 16, the side face of said lever slips from behind the free end edge portion of latch lever 132 and the latter swings to engage stop 134'. This brings the tip end of latch lever 132 against an edge portion of lever 127 which is thereby latched in clutch closing position and so maintained until latch lever 132 is rocked against tension of spring 135 back to its initial position, as seen in Figure 15.

Latch lever 132 is provided with an upwardly extending arm 137 arranged to be engaged and moved by the trip rod 34 on farthest advance slide C when the latter is moved to and reaches its initial or starting position. This engagement causes the free end of latch lever 132 to swing away from plate 134 whereupon clutch lever 127 swings back to its initial position between said free end portion and said stop plate. In so doing the lower end, Figure 15, of lever 127 swings back toward lever 124 and releases the engaged end of locking lever 122 which is now free to yield and permit the return swing of lever arm 110. This return swing will occur immediately if a record has been emplaced on the mandrel or, if not, will occur as soon as such emplacement shall be completed after release of latch lever 132 as above described.

To insure continued safe movement between the record being emplaced and the styli, more particularly toward the end of record emplacement, the translation unit, including said styli is retained in neutral with the control parts taking the relative positions substantially as seen in Figure 14. Thus, as slide 101 moves toward the left, pawl 106 engages and rides over pin 126 on lever 124. The consequent tilting of pawl 106 carries a tip end portion of the arm thereof into engagement with a portion of locking lever 122, Figure 14, whereby said lever is prevented from releasing lever arm 110 until after the camming end of pawl 106 passes pin 126. As previously explained, the last increment of return movement of slide 101 during which the above described supplemental locking occurs is induced by spring 100 and not by direct thrust of the record against the plate 138 at the outer end of plunger 9.

*Return of farthest advance slide*

When a record has been ejected, the feed nut 24 is out of engagement with feed screw 23; and the farthest advance slide C and the carriage B are free to be returned to starting position by retracting mechanism including a cord 140, Figure 15, having one end secured to the extension 31 of the farthest advance slide bushing 29, Figure 2, and a portion of its other end wound on a sleeve 141 which also forms a winding drum.

Sleeve 141 is journaled in a fixed bracket 142 and carries at its inner end a clutch tooth 143 arranged opposite a serrated clutch ring 144 on a clutch collar 145. Said collar 145 is slidably keyed on a shaft 146 in position to be engaged and actuated by the bent-in-ends or yoke of clutch lever 127. Shaft 146 is journaled at one end in a box 147 and at the other end in said sleeve 141. A gear 148 secured on shaft 146 is driven through a suitable train from a gear 149 on the hub of the pulley 4. With this arrangement shaft 146 rotates continuously while the driving motor is on.

In operation, during recording, advance slide C is moved with carriage B to the right, Figure 15, unwinding cord 140 from the freely rotatable sleeve 141 as it goes. When the record is filled, or at other appropriate time, the operator swings the ejector lever 37 to remove the record. This simultaneously disengages the feed nut and rocks clutch lever 127. Clutch ring 144 is thereby moved to engage clutch tooth 143 and is held in that position by latch 132 engaging an edge portion of lever 127. This causes sleeve 141 to rotate in a direction to wind in cord 140 and thus draw the farthest advance slide and thereby the carriage toward starting position. As said parts reach starting position the leading end of trip rod 34 engages arm 137 to dislodge latch lever 132 from the edge of lever 127. Thereupon spring 130 swings lever 127 to disengage ring 144 from tooth 143 and the return travel of farthest advance slide C is stopped.

If for any reason the translation unit is in reproducing condition when the ejector lever is operated to remove a record, the above-described return movement of the advance slide brings the latter against the carriage at some point in its travel, or at the end thereof, depending on the position of the carriage at the time the record is ejected. In any case, trip pin 139 on slide C moves against the extended end of slide pin 65 which is thereby moved in a direction to release reproducing latch lever 45 in the same manner as when the carriage is moved to bring pin slide 65 against trip pin 139 at the end of reproducing. The effect in both cases is to automatically release the translation unit into recording condition where it is locked until changed by a subsequent hand operation of the dictate lever 37 in a manner previously described.

We claim:

1. In a dictating machine wherein a stylus support is mounted on a carriage and a power driven feed screw is arranged to be engaged by a feed nut operatively connected to said carriage to advance said carriage longitudinally in relation to a record support during recording and reproducing and means are provided for returning the carriage to a starting position, said machine comprising in combination, a record ejector lever, a trip carrying member slidably mounted at one side of said carrier and arranged and adapted to be engaged and advanced by said carrier during advance movement thereof in recording, means operatively connected with said ejector lever and arranged and adapted to disengage the feed nut from the feed screw when said ejector lever is actuated to remove a record, means operative independently of said feed screw from the same source of power as said feed screw and arranged and adapted to move said trip carrying member against said carriage and in a direction to return said member and said carriage to said starting position, a clutch operatively connected with said ejector lever for starting said trip carrying member moving means, and means operatively connected with said trip carrying member and arranged and adapted to operate when the latter reaches starting position for stopping said trip carrying member moving means.

2. In a dictating machine, in combination, a carriage operatively movable in relation to a rotatable record support, a feed screw for causing a forward feed of said carriage, a feed nut, a feed nut support comprising a sleeve rotatively and slidably mounted for movement to move the feed nut into and out of engagement with said feed screw, a stud on said carriage rotatably and slidably supporting said sleeve, a cam lever pivotally mounted upon said stud, a torsion spring having ends abutting respectively with said feed nut support and a portion of said carriage and surrounding said stud and sleeve for biasing said feed nut support both toward said feed screw and toward said cam lever, a manual control lever mounted on said carriage, means connecting said control lever with said cam lever to shift said cam lever upon operation of said control lever, and cooperating camming means upon said cam lever and said feed nut support for effecting a backward movement of said carriage in opposition to endwise reaction of said spring relative to said feed nut while the feed nut is in engagement with the feed screw.

3. In a dictating machine, in combination, a carriage operatively movable in relation to a rotatable record support, a feed screw for causing a forward feed of said carriage, a feed nut, a feed nut support comprising a sleeve rotatively and slidably mounted for movement to move the feed nut into and out of engagement with said feed screw, a stud on said carriage rotatably and slidably supporting said sleeve, a cam lever pivotally mounted upon said stud, a torsion spring having ends abutting respectively with said feed nut support and a portion of said carriage and surrounding said stud and sleeve for biasing said feed nut support both toward said feed screw and toward said cam lever, a manual control lever mounted on said carriage, a stylus support on said carriage movable relatively to said carriage and said record support to and from a neutral condition, means operatively connecting said stylus support and said control lever to move said stylus support to said neutral condition, and means operatively connecting said cam lever and said control lever to effect said movement of said stylus support upon operation of said control lever to effect the backward shift of said carriage.

4. A dictating machine wherein a stylus support is mounted to be moved to and from a neutral condition on a carriage movable with a feed nut support in operative relation to a record support and to a feed screw, comprising, in combination, a rocker tube on the carriage, a translation device connected at an end of said tube in rigid angular relation to said tube adapted normally to swing with said tube freely to a recording position or selectively to a reproducing position and comprising recording and reproducing styli, a hand operable control lever pivotally mounted adjacent said tube in coaxial relation with the pivotal axis of said tube and having a normal unoperated position, actuating means pivotally mounted on said carriage and operatively associated with said tube and said control lever to effect movement of said translation device from said recording to said neutral and reproducing positions, a recording latch lever on said carriage cooperative with means on said tube to hold said translation device in recording position and releasable upon operation of said control lever to permit movement of said device to reproducing position, biasing means associated with said latch and control lever normally to hold said control lever in said normal unoperated position, and cooperative means on said latch lever and control lever for releasing said latch.

5. A dictating machine wherein a stylus support is mounted to be moved to and from a neutral condition on a carriage movable with a feed nut support in operative relation to a record support and to a feed screw, comprising, in combination, a rocker tube on the carriage, a translation device connected at an end of said tube in rigid angular relation to said tube adapted normally to swing with said tube freely to a recording position or selectively to a reproducing position and comprising recording and reproducing styli, a hand operable control lever pivotally mounted adjacent said tube in coaxial relation with the pivotal axis of said tube and having a normal unoperated position, actuating means pivotally mounted on said carriage and operatively associated with said tube and said control lever to effect movement of said translation device from said recording to said neutral and reproducing positions, a reproducing latch lever on said carriage cooperative with means on said tube to hold said translation device in reproducing position and releasable to permit return of said device to recording position, a farthest advance slide operatively related to said carriage and arranged and adapted to be advanced in one direction by advance movement of said carriage and to hold its position of farthest advance, during a backward movement of said carriage made for the purpose of reproducing any part of the record track short of said advance position, and means on said advance slide for releasing said reproducing latch lever.

6. A dictating machine wherein a stylus support is mounted to be moved to and from a neutral condition on a carriage movable with a feed nut support in operative relation to a record support and to a feed screw, comprising, in combination, a rocker tube on the carriage, a translation device connected at an end of said tube in rigid angular relation to said tube adapted normally to swing with said tube freely to a recording position or selectively to a reproducing position and comprising recording and reproducing styli, a hand operable control lever pivotally mounted adjacent said tube in coaxial relation with the pivotal axis of said tube and having a normal unoperated position, actuating means pivotally mounted on said carriage and operatively associated with said tube and said control lever to effect movement of said translation device from recording to neutral and reproducing positions, a recording latch lever on said carriage cooperative with means on said tube to hold said translation device in recording position and releasable upon operation of said control lever to permit movement of said device to reproducing position, biasing means associated with said latch and control levers normally to hold said control lever in said normal unoperated position, cooperative means on said latch lever and control lever for releasing said latch, a reproducing latch lever on said carriage cooperative with said means on said tube to hold said translation device in said reproducing position and releasable to permit return of said device to said recording position, a farthest advance slide operatively related to said carriage and arranged and adapted to be advanced in one direction by advance movement of said carriage and to hold its position of farthest advance, during a backward movement of said carriage made for the purpose of reproducing any part of the record track short of said advance position, and means on said advance slide for releasing said reproducing lever.

7. In a dictating machine wherein a stylus support is mounted to be moved to and from a neutral condition on a carriage in relation to a record support along which said carriage is movable, in combination, means for advancing the carriage along the record support, means for returning said carriage comprising a farthest advance slide adapted to move with said carriage from an initial position to any point of farthest advance of said carriage, power control means for the return movement of said slide, a record ejector adapted for operation to remove a record from said record support, an ejector control lever, means operatively associated with said power control means and said record ejector control lever to initiate the return movement of said advance slide and carriage in response to an ejective operation of said record ejector control lever, means connecting said record ejector control lever with said stylus support adapted to move the latter away from said record support to an inoperative position in response to ejective operation of said ejector control lever, means associated with said power control means adapted to lock said control means in operative position and said stylus support in said inoperative position, and means associated with said advance slide adapted upon return of the latter to said initial position to render said power control means inoperative and release said stylus support lock to permit return of said stylus support to operative condition.

8. A dictating machine wherein a stylus support is mounted on a carriage and a feed screw is arranged to be engaged by a feed nut operatively connected to said carriage to advance said carriage longitudinally in relation to a record support for recording and reproducing dictation and means are provided for returning the carriage to a starting position, said machine comprising in combination, a record ejector lever, a trip carrying member slidably mounted at one side of said carriage and arranged and adapted to be engaged and advanced by said carriage during advance movement thereof in recording, means operatively connected with said ejector lever and arranged and adapted to disengage the feed nut from the feed screw when said ejector lever is actuated to remove a record, power means operative independently of said feed screw and arranged and adapted to move said trip carrying member against said carriage and in a direction to return said member and said carriage to starting position, means operatively connected with said ejector lever for starting the operation of said trip carrying member moving means, means operatively connected with said trip carrying member and arranged and adapted to operate when the latter reaches starting position for stopping said trip carrying member moving means, means for moving said stylus support into and out of operative condition relative to said record support, and means operatively connected with said feed nut disengaging means to move said stylus support to an inoperative position when said ejector lever is actuated to remove a record.

JOHN H. TREVITT.
JOHN E. RENHOLDT.

REFERENCES CITED

The following references are of record in the file of this patent:

UNITED STATES PATENTS

| Number | Name | Date |
|---|---|---|
| 1,939,412 | Roberts | Dec. 12, 1933 |
| 2,030,638 | Johnson | Feb. 11, 1936 |
| 2,070,180 | Renholdt | Feb. 9, 1937 |
| 2,071,972 | Feyrer | Feb. 23, 1937 |
| 2,102,366 | Lucarelle et al. | Dec. 14, 1937 |
| 2,127,593 | Gramann | Aug. 23, 1938 |
| 2,152,585 | Feyrer | Mar. 28, 1939 |
| 2,212,672 | Somers | Aug. 27, 1940 |
| 2,223,723 | Fox | Dec. 3, 1940 |
| 2,270,832 | Dunning et al. | Jan. 20, 1942 |
| 2,284,836 | Norton et al. | June 2, 1942 |
| 2,380,754 | Hardy | July 31, 1945 |